US012770868B2

(12) United States Patent

Katogi et al.

(10) Patent No.: US 12,770,868 B2
(45) Date of Patent: Oct. 20, 2026

(54) NON-AQUEOUS ELECTROLYTE SECONDARY BATTERY HAVING A NEGATIVE ELECTRODE MIXTURE MULTILAYER COATING

(71) Applicant: Panasonic Energy Co., Ltd., Moriguchi (JP)

(72) Inventors: Akihiro Katogi, Tokushima (JP); Takamitsu Tashita, Tokushima (JP); Fumikazu Mizukoshi, Osaka (JP); Sho Urata, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 505 days.

(21) Appl. No.: 18/271,757

(22) PCT Filed: Jan. 14, 2022

(86) PCT No.: PCT/JP2022/001019
§ 371 (c)(1),
(2) Date: Jul. 11, 2023

(87) PCT Pub. No.: WO2022/158375
PCT Pub. Date: Jul. 28, 2022

(65) Prior Publication Data

US 2024/0063377 A1 Feb. 22, 2024

(30) Foreign Application Priority Data

Jan. 21, 2021 (JP) ................................ 2021-007957

(51) Int. Cl.
*H01M 4/38* (2006.01)
*H01M 4/36* (2006.01)
(Continued)

(52) U.S. Cl.
CPC ........... *H01M 4/386* (2013.01); *H01M 4/364* (2013.01); *H01M 4/587* (2013.01); *H01M 4/661* (2013.01);
(Continued)

(58) Field of Classification Search
CPC ...... H01M 4/386; H01M 4/364; H01M 4/587; H01M 4/661
See application file for complete search history.

(56) References Cited

U.S. PATENT DOCUMENTS 9,350,042 B2 5/2016 Suwa
9,627,722 B1 * 4/2017 Fan ..................... C09D 179/08
(Continued)

FOREIGN PATENT DOCUMENTS

CN 106299332 A 1/2017
CN 111183542 A 5/2020
(Continued)

OTHER PUBLICATIONS

Tan et al., "Atomic layer deposition-strengthened lithiophilicity of ultrathin TiO2 film", Journal ofPower Sources (Year: 2020).*
(Continued)

*Primary Examiner* — Jimmy Vo
(74) *Attorney, Agent, or Firm* — WHDA, LLP

(57) ABSTRACT

A non-aqueous electrolyte secondary battery provided with a positive electrode, a negative electrode, and a non-aqueous electrolyte. The negative electrode includes a negative electrode current collector and a negative electrode mixture layer formed on the surface of the negative electrode current collector. The negative electrode mixture layer includes a first negative electrode mixture layer opposite to the negative electrode current collector, and a second negative electrode mixture layer laminated on the surface of the first negative electrode mixture layer. The negative electrode
(Continued)

mixture layer includes graphite particles and a highly dielectric material having a higher dielectric constant than the graphite particles. The porosity between the graphite particles in the second negative electrode mixture layer is greater than in the first negative electrode mixture layer. The content proportion of the highly dielectric material in the first negative electrode mixture layer is greater than in the second negative electrode mixture layer.

4 Claims, 3 Drawing Sheets

(51) Int. Cl.

| | |
|---|---|
| ***H01M 4/587*** | (2010.01) |
| ***H01M 4/66*** | (2006.01) |
| ***H01M 10/0525*** | (2010.01) |
| *H01M 4/02* | (2006.01) |

(52) U.S. Cl.

CPC .. *H01M 10/0525* (2013.01); *H01M 2004/021* (2013.01)

(56) References Cited

U.S. PATENT DOCUMENTS

| | | | | |
|---|---|---|---|---|
| 2013/0224593 A1* | 8/2013 | Visco | H01M 4/70 429/246 |
| 2014/0287316 A1 | 9/2014 | Ahn et al. | |
| 2017/0125806 A1 | 5/2017 | Wang et al. | |
| 2020/0185725 A1 | 6/2020 | Ishiguro et al. | |
| 2020/0403231 A1 | 12/2020 | Kim et al. | |

FOREIGN PATENT DOCUMENTS

| | | | | |
|---|---|---|---|---|
| JP | 2008-27879 A | 2/2008 | |
| JP | 2015-511389 A | 4/2015 | |
| JP | 2020-95853 A | 6/2020 | |
| WO | 2016/035289 A1 | 3/2016 | |
| WO | WO-2020175361 A1 * | 9/2020 | H01M 4/587 |

OTHER PUBLICATIONS

WO_2020175361 Translaion (Year: 2020).*

International Search Report dated Mar. 29, 2022, issued in counterpart International Application No. PCT/JP2022/001019 (2 pages).

Extended (supplementary) European Search Report dated Jun. 26, 2025, issued in counterpart EP Application No. 22742497.5 (9 pages).

Office Action dated Feb. 4, 2026, issued in counterpart IN Application No. 202317045492.(6 pages).

Office Action dated May 22, 2026, issued in counterpart CN Application No. 202280009459.0, with English translation. (9 pages).

* cited by examiner

NON-AQUEOUS ELECTROLYTE SECONDARY BATTERY HAVING A NEGATIVE ELECTRODE MIXTURE MULTILAYER COATING

CROSS-REFERENCE TO RELATED APPLICATION

This application is a National Phase Application filed under 35 U.S.C. § 371 of International Application No. PCT/JP2022/001019 filed on Jan. 14, 2022 which claims the benefit of priority under 35 U.S.C. § 119 (a) of Japanese Patent Application No. 2021-007957 filed in Japan on Jan. 21, 2021, the contents of which are incorporated herein by reference.

TECHNICAL FIELD

The present disclosure relates to a non-aqueous electrolyte secondary battery.

BACKGROUND

Non-aqueous electrolyte secondary batteries which use graphite particles as a negative electrode active material are widely in use as secondary batteries of high energy densities. When a packing density of a negative electrode mixture layer is increased in order to increase a capacity of the battery, pores between graphite particles become smaller, and permeability of the non-aqueous electrolyte to the negative electrode mixture layer is degraded, which results in a problem in that the battery capacity is reduced with repetition of charging and discharging. For example, Patent Literature 1 discloses an electrode in which, from a viewpoint of improvement of wettability of an electrode surface, a mixed layer containing an active material and an insulating oxide such as alumina, titanium oxide, or the like is formed over a surface of the mixture layer.

CITATION LIST

Patent Literature

PATENT LITERATURE 1: JP 2008-27879 A

SUMMARY

Problem to be Solved

However, by solely improving the wettability of the electrode surface, it is not possible to sufficiently suppress the reduction of the battery capacity due to the repetition of the charging and discharging because the non-aqueous electrolyte does not permeate deeply into the inside of the negative electrode mixture layer.

An advantage of the present disclosure lies in provision of a non-aqueous electrolyte secondary battery in which reduction of the battery capacity due to the repetition of the charging and discharging is suppressed.

Solution to Problem

According to one aspect of the present disclosure, there is provided a non-aqueous electrolyte secondary battery including: a positive electrode; a negative electrode; and a non-aqueous electrolyte, wherein the negative electrode includes a negative electrode current collector, and a negative electrode mixture layer formed over a surface of the negative electrode current collector, the negative electrode mixture layer includes a first negative electrode mixture layer opposing the negative electrode current collector, and a second negative electrode mixture layer layered over a surface of the first negative electrode mixture layer, the negative electrode layer includes graphite particles and a highly dielectric material having a higher dielectric constant than the graphite particles, a porosity between the graphite particles in the second negative electrode mixture layer is higher than a porosity between the graphite particles in the first negative electrode mixture layer, and a percentage content of the highly dielectric material in the first negative electrode mixture layer is higher than a percentage content of the highly dielectric material in the second negative electrode mixture layer.

Advantageous Effects

According to an aspect of the present disclosure, a charge/discharge cycle characteristic of a non-aqueous electrolyte secondary battery can be improved.

DESCRIPTION OF EMBODIMENTS

A secondary battery of a circular cylindrical type according to an embodiment of the present disclosure will now be described in detail with reference to the drawings. In the following, a specific shape, a specific material, a specific numerical value, a specific direction, and like are merely exemplary for the purpose of facilitating understanding of the present disclosure, and these parameters may be suitably changed according to the specification of the circular cylindrical secondary battery. Further, the outer housing is not limited to the circular cylindrical type, and may alternatively be, for example, of a polygonal type. In the following description, when a plurality of embodiments and alternative configurations are included, suitable combination of the characteristic portions thereof are contemplated from the start.

Figure 1:
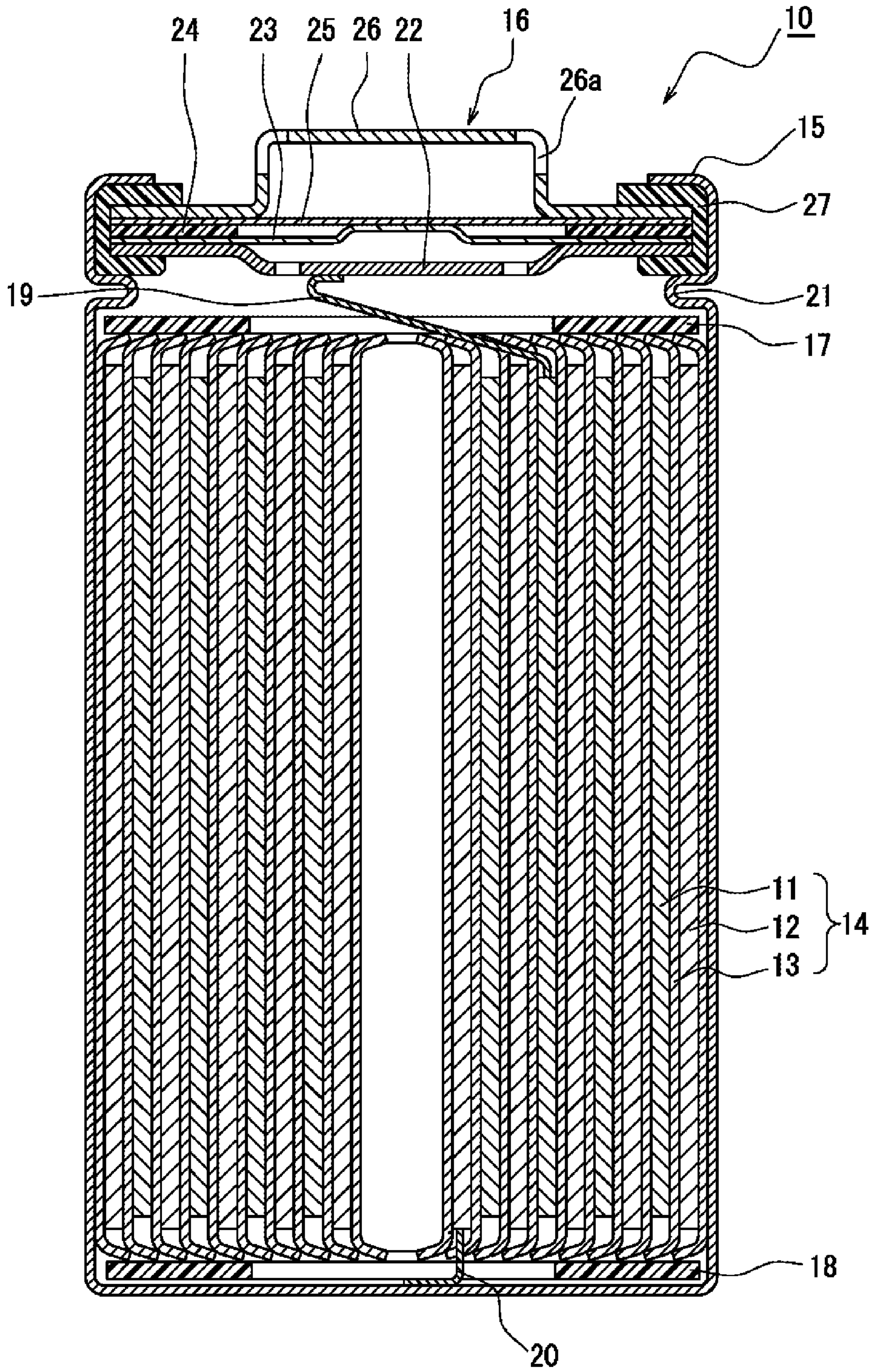
FIG. 1 is a cross-sectional diagram along an axial direction of a secondary battery of a circular cylindrical type according to an embodiment of the present disclosure.

FIG. 1 is a cross-sectional diagram in an axial direction of a secondary battery 10 of a circular cylindrical type according to an embodiment of the present disclosure. In the secondary battery 10 shown in FIG. 1, an electrode assembly 14 and a non-aqueous electrolyte (not shown) are housed in an outer housing 15. The electrode assembly 14 has a wound type structure in which a positive electrode 11 and a negative electrode 12 are wound with a separator 13 therebetween. In the following, for convenience of description, a side of a sealing assembly 16 will be referred to as an "upper side", and a side of a bottom of the outer housing 15 will be referred to as a "lower side".

An opening end of the outer housing 15 is blocked by the sealing assembly 16 so that an inside of the secondary battery 10 is airtightly closed. Insulating plates 17 and 18 are provided respectively above and below the electrode assembly 14. A positive electrode lead 19 extends upward through a through hole of the insulating plate 17, and is welded to a lower surface of a filter 22 which is a bottom plate of the sealing assembly 16. In the secondary battery 10, a cap 26 which is a top plate of the sealing assembly 16 electrically connected to the filter 22 serves as a positive electrode terminal. On the other hand, a negative electrode lead 20 extends to the side of the bottom of the outer housing 15 through a through hole of the insulating plate 18, and is welded to an inner surface of the bottom of the outer housing 15. In the secondary battery 10, the outer housing 15 serves as a negative electrode terminal. When the negative electrode lead 20 is placed at a terminating end, the negative electrode lead 20 extends through an outer side of the insulating plate 18 and to the side of the bottom of the outer housing 15, and is welded to the inner surface of the bottom of the outer housing 15.

The outer housing 15 is, for example, a metal outer housing can of a circular cylindrical shape with a bottom. A gasket 27 is provided between the outer housing 15 and the sealing assembly 16, so as to secure airtightness of the inside of the secondary battery 10. The outer housing 15 has a groove portion 21 which is formed, for example, by pressing a side surface portion from an outer side, and which supports the sealing assembly 16. The groove portion 21 is desirably formed in an annular shape along a circumferential direction of the outer housing 15, and supports the sealing assembly 16 with the upper surface thereof, via the gasket 27.

The sealing assembly 16 has the filter 22, a lower vent member 23, an insulating member 24, an upper vent member 25, and the cap 26, which are layered in this order from the side of the electrode assembly 14. The members of the sealing assembly 16 have, for example, a circular disk shape or a ring shape, and members other than the insulating member 24 are electrically connected to each other. The lower vent member 23 and the upper vent member 25 are connected to each other at respective center parts, and the insulating member 24 interposes between peripheral parts of the vent members. When an inner pressure of the battery increases due to abnormal heat generation, for example, the lower vent member 23 ruptures, and the upper vent member 25 expands to the side of the cap 26, and moves away from the lower vent member 23, so that the electrical connection between the vent members is shut out. When the inner pressure further increases, the upper vent member 25 ruptures, and gas is discharged from an opening 26*a* of the cap 26.

The positive electrode 11, the negative electrode 12, the separator 13, and the non-aqueous electrolyte forming the secondary battery 10 will now be described in detail. In particular, a negative electrode mixture layer 32 of the negative electrode 12 will be described in detail.

[Negative Electrode]

Figure 2:
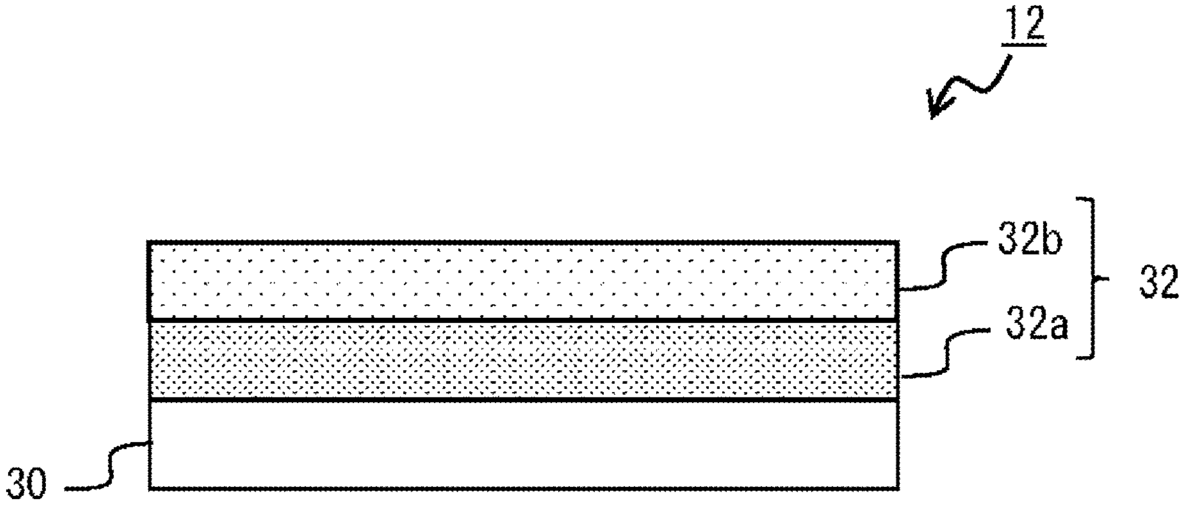
FIG. 2 is a cross-sectional diagram of a negative electrode according to an embodiment of the present disclosure.

FIG. 2 is a cross-sectional diagram of the negative electrode 12 according to an embodiment of the present disclosure. The negative electrode 12 includes a negative electrode current collector 30, and the negative electrode mixture layer 32 formed over a surface of the negative electrode current collector 30. The negative electrode mixture layer 32 includes a first negative electrode mixture layer 32*a* opposing the negative electrode current collector 30, and a second negative electrode mixture layer 32*b* layered over a surface of the first negative electrode mixture layer 32*a*. The first negative electrode mixture layer 32*a* and the second negative electrode mixture layer 32*b* may have a same thickness or thicknesses different from each other. A ratio of the thicknesses between the first negative electrode mixture layer 32*a* and the second negative electrode mixture layer 32*b* is, for example, 3:7~7:3, is desirably 4:6~6:4, and is more desirably 5:5~6:4.

For the negative electrode current collector 30, there may be employed, for example, a foil of metal stable within a potential range of the negative electrode such as copper, a film on a surface layer of which the metal is placed, or the like. A thickness of the negative electrode current collector 30 is, for example, 5 μm~30 μm.

The negative electrode mixture layer 32 include graphite particles serving as a negative electrode active material. As the graphite particles, there may be exemplified, for example, natural graphite, artificial graphite, or the like. From the viewpoint of ease of adjustment of an internal porosity to be described below, artificial graphite is desirable. A plane spacing ($d_{002}$) of a (002) plane of the graphite particles, measured by X-ray wide-angle diffraction, is, for example, desirably greater than or equal to 0.3354 nm, and is more desirably greater than or equal to 0.3357 nm, and is desirably smaller than 0.340 nm, and is more desirably smaller than or equal to 0.338 nm. Further, a crystallite size (Lc(002)) of the graphite particles, determined by X-ray diffraction, is, for example, desirably greater than or equal to 5 un, and is more desirably greater than or equal to 10 nm, and is desirably smaller than or equal to 300 nm, and is more desirably smaller than or equal to 200 nm. When the plane spacing ($d_{002}$) and the crystallite size (Lc(002)) satisfy the above-described ranges, the battery capacity of the non-aqueous secondary battery tends to become larger in comparison to cases in which the above-described ranges are not satisfied.

Figure 3:
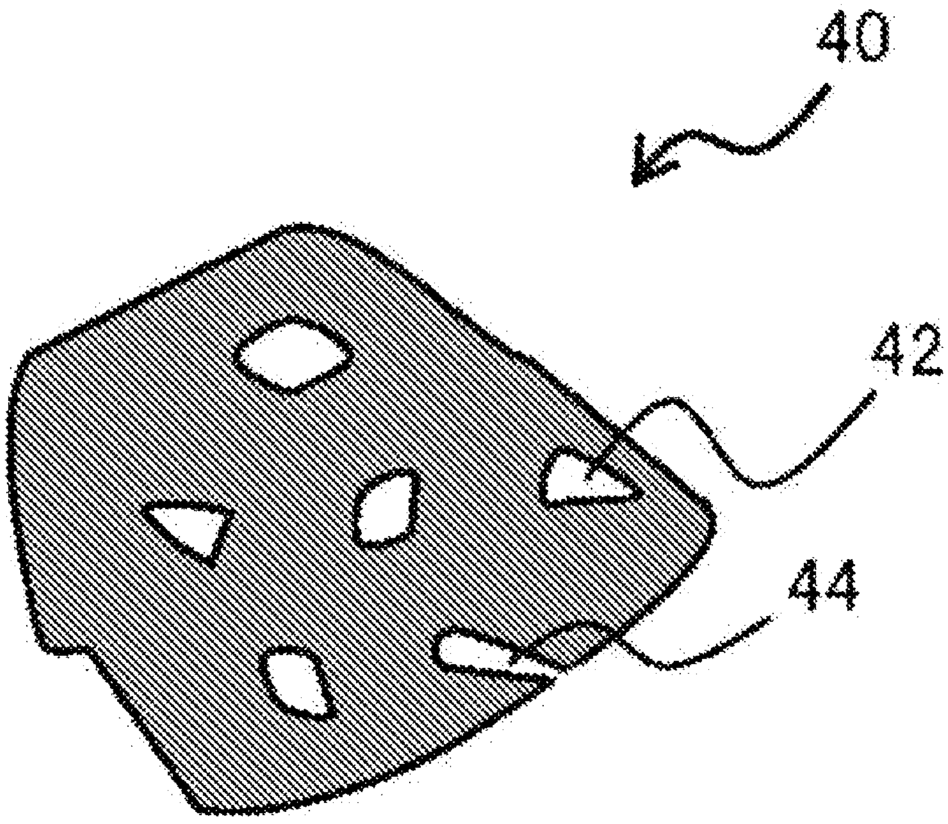
FIG. 3 is a schematic diagram showing a cross section of graphite particles in an embodiment of the present disclosure.

FIG. 3 is a schematic diagram showing a cross section of graphite particles 40. As shown in FIG. 3, on the cross-sectional view of the graphite particles 40, the graphite particles 40 include pores 42 which are not connected from the inside of the particles to the surface of the particles and which are closed (hereinafter, "internal pores 42"), and pores 44 which are connected from the inside of the particles to the surface of the particles (hereinafter, "external pores 44"), A porosity between the graphite particles in the second negative electrode mixture layer 32*b* is higher than a porosity between the graphite particles in the first negative electrode mixture layer 32*a*. A ratio (S2/S1) of the porosity (S2) between graphite particles in the second negative electrode mixture layer 32*b* to the porosity (S1) between graphite particles in the first negative electrode mixture layer 32*a* is desirably $1<S2/S1\leq 2$, is more desirably $1.1\leq S2/S1\leq 1.7$, and is particularly desirably $1.1\leq S2/S1\leq 1.5$. When S2/S1 is less than or equal to 1 ($S2/S1\leq 1$), the permeability of the non-aqueous electrolyte in the second negative electrode mixture layer 32*b* is inferior, and the battery capacity is reduced with the repetition of charging and discharging. Further, by setting S2/S1 to be less than or equal to 2 ($S2/S1\leq 2$), it becomes possible to easily reduce a difference in the packing density between the first negative electrode mixture layer 32*a* and the second negative electrode mixture layer 32*b*. Here, the porosity between graphite particles is a two-dimensional value determined from ratios of areas of pores between the graphite particles with respect to a cross-sectional area of the negative electrode mixture layer 32. The parameter S2/S1 is determined by calculating the porosity (S1) between graphite particles in the first negative electrode mixture layer 32*a* and the porosity (S2) between graphite particles in the second negative electrode mixture layer 32*b* with the following procedure.

<Measurement Method of Porosity Between Graphite Particles>

(1) A cross section of the negative electrode mixture layer is exposed. As a method of exposing the cross section, for example, there may be exemplified a method in which a portion of the negative electrode is cut out, and machined with an ion milling device (for example, IM4000PLUS manufactured by Hitachi High-Tech Corporation), to expose the cross section of the negative electrode mixture layer.

(2) Using a scanning electron microscope, a backscattered electron image of the exposed cross section of the negative electrode mixture layer is captured for each of the first negative electrode mixture layer 32*a* and the second negative electrode mixture layer 32*b*. A magnification when the backscattered electron image is captured is, for example, 800 times.

(3) The cross-sectional image obtained by the process described above is captured into a computer, and, using an image analyzing software (for example. ImageJ manufactured by National Institute of Health) a binarization process is applied, to obtain a binarization-processed image in which a cross section of the particles in the cross sectional image is converted to black color, and the pores existing in the cross section of the particles are converted to white color.

(4) In each of the binarization-processed images of the first negative electrode mixture layer 32*a* and the second negative electrode mixture layer 32*b*, among the pores converted to the white color, portions other than the internal pores 42 and the external pores 44 having a width of smaller than or equal to 3 μm are set as pores between the graphite particles, and areas of the pores between graphite particles are then calculated. The porosity between the graphite particles can be calculated based on the following formula.

(Porosity between graphite particles)=(areas of pores between graphite particles)/(area of cross section of negative electrode mixture layer)*100

(5) The parameters S1 and S2 are determined as average values of the above-described measurements for three times.

As means for adjusting the porosities between the graphite particles in the first negative electrode mixture layer 32*a* and the second negative electrode mixture layer 32*b*, for example, there may be exemplified means that adjusts the packing density of the negative electrode mixture layer, and means that adjust the internal porosity of the graphite particles. According to the latter means, the porosity between the graphite particles can be increased by reducing the internal porosity of the graphite particles, without reducing the packing densities of the first negative electrode mixture layer 32*a* and the second negative electrode mixture layer 32*b*. That is, by setting the packing densities of the first negative electrode mixture layer 32*a* and the second negative electrode mixture layer 32*b* equivalent to each other, and reducing the internal porosity of graphite particles B included in the second negative mixture layer 32*b* in comparison to graphite particles A included in the first negative electrode mixture layer 32*a*, it is possible to satisfy the condition of S2/S1>1.

The graphite particles A included in the first negative electrode mixture layer 32*a* can be produced, for example, through the following method. Cokes (precursor) which are the primary raw material are ground to a predetermined size, are aggregated with a binder agent, and are pressurized and shaped in a block form. Then, the block form structure is baked at a temperature of greater than or equal to 2600° C. for graphitization. The graphitized block-form shaped structure is ground and sieved, to obtain graphite particles A of a desired size. Here, the internal porosity can be adjusted to be greater than that for the graphite particles B to be described later by an amount of a volatile composition added to the block-form shaped structure. The internal porosity of the graphite particles A is desirably 8%~20%, is more desirably 10%~18%, and is particularly desirably 12%~16%. When a part of the binder agent added to the cokes (precursor) evaporates during the baking, the binder agent may be used as the volatile composition. As such a binder agent, pitch may be exemplified.

The graphite particles B included in the second negative electrode mixture layer 32*b* may be produced, for example, through the following method. Cokes (precursor) which are the primary raw material are ground to a predetermined size, and are aggregated with a binder agent. The resulting structure is baked at a temperature of greater than or equal to 2600° C. for graphitization, and is sieved, to obtain graphite particles B of a desired size. Here, the internal porosity of the graphite particles B can be adjusted by a particle size of the precursor after the grinding, the particle size of the precursor in the aggregated state, or the like. For example, the internal porosity can be reduced by increasing the particle size of the precursor after grinding. An average particle size of the precursor after the grinding (a volume-equivalent median radius D50; similarly in the following description) may be within a range of 12 μm~20 μm. The internal porosity of the graphite particles B is desirably less than or equal to 5%, is more desirably 1%~5%, and is particularly desirably 3%5%.

Next, a method for forming the first negative electrode mixture layer 32*a* and the second negative electrode mixture layer 32*b* will be described. For example, first, a negative electrode active material including the graphite particles A, a binder agent, and a solvent such as water are mixed, to prepare a first negative electrode mixture slurry. Separately, a negative electrode active material including graphite particles B, a binder agent, and a solvent such as water are mixed, to prepare a second negative electrode mixture slurry. After the first negative electrode mixture slurry is applied and dried over both surfaces of the negative electrode current collector, the second negative electrode mixture slurry is applied and dried over the applied films of the first negative electrode mixture slurry. Then, with a rolling roller, the first negative electrode mixture layer 32*a* and the second negative electrode mixture layer 32*b* are rolled, to form the negative electrode mixture layer 32. In the method described above, the second negative electrode mixture slurry is applied after the first negative electrode mixture slurry is applied and dried, but alternatively, the second negative electrode mixture slurry may be applied after the application of the first negative electrode mixture slurry and before the drying. Further alternatively, the second negative electrode mixture slurry may be applied over the first negative electrode mixture layer 32*a* after the first negative electrode mixture slurry is applied, dried, and rolled. The degree of freedom of adjustment of the packing densities can be increased by varying the conditions of rolling of the first negative electrode mixture layer 32*a* and the second negative electrode mixture layer 32*b*.

The negative electrode mixture layer 32 further includes a highly dielectric material having a higher dielectric constant than the graphite particles. A percentage content of the highly dielectric material in the first negative electrode mixture layer 32*a* is higher than a percentage content of the highly dielectric material in the second negative electrode mixture layer 32*b*. By setting the percentage content of the highly dielectric material in the first negative electrode mixture layer 32*a* to be higher than the percentage content of the highly dielectric material in the second negative electrode mixture layer 32*b*, while setting S2/S1>1, the permeability of the non-aqueous electrolyte in the first negative electrode mixture layer 32*a* which opposes the negative electrode current collector 30 can be improved. Thus, the permeability of the non-aqueous electrolyte can be improved for the negative electrode mixture layer 32 as a whole. With this configuration, the charge/discharge cycle characteristic of the battery can be improved. The percentage content of the highly dielectric material is a ratio of a mass of the highly dielectric material with respect to a mass of the negative electrode active material.

No particular limitation is imposed on the highly dielectric material so long as the highly dielectric material has a higher relative dielectric constant than the graphite particles. There may be exemplified, for example, titanium oxide ($TiO_2$), lithium titanate ($Li_2TiO_3$), barium oxide (BaO), and the like. The highly dielectric material desirably contains at least one of titanium oxide ($TiO_2$) and lithium titanate ($Li_2TiO_3$). The relative dielectric constant of the graphite particles is about 12, the relative dielectric constant of $TiO_2$ is about 100, and the relative dielectric constant of $Li_2TiO_3$ is about 30. An average particle size (D50) of the highly dielectric material is, for example, 300 nm~3 μm.

The percentage content of the highly dielectric material in the first negative electrode mixture layer 32*a* is desirably 1 mass %~10 mass % with respect to the mass of the negative electrode active material included in the first negative electrode mixture layer 32*a*, is more desirably 2 mass %~7 mass %, and is particularly desirably 2.5 mass %~5 mass %. When the percentage content is within this range, the reduction of the battery capacity can be suppressed while improving the charge/discharge cycle characteristic.

The negative electrode mixture layer 32 may further include a Si-based material serving as a negative electrode active material. The Si-based material is a material which can reversibly occlude and release lithium ions, and functions as a negative electrode active material. As the Si-based material, for example, there may be exemplified Si, an alloy including Si, silicon oxides represented by $SiO_x$ (wherein x is 0.8~1.6), or the like. The Si-based material is a negative electrode material which can improve the battery capacity more than the graphite particles. A content of the Si-based material is, for example, desirably 1 mass %~10 mass % with respect to the mass of the negative electrode active material, and is more desirably 3 mass %~7 mass %, from the viewpoints of improvement of the battery capacity and suppression of reduction of the charge/discharge cycle characteristic.

Examples of other materials which can reversibly occlude and release the lithium ions include metals which form an alloy with lithium such as tin (Sn), or an alloy or an oxide including the metal element such as Sn. The negative electrode active material may include these other materials, and a content of these other materials is, for example, desirably less than or equal to 10 mass % with respect to the mass of the negative electrode active material.

The negative electrode mixture layer 32 may include a binder agent. As the binder agent, there may be exemplified, for example, a fluorine-based resin, PAN, a polyimide-based resin, an acrylic resin, a polyolefin-based resin, styrene-butadiene rubber (SBR), nitrile-butadiene rubber (NBR), carboxymethyl cellulose (CMC) or a salt thereof, polyacrylic acid (PAA) or a salt thereof (such as PAA-Na, PAA-K, or a fractional neutralization type salt), polyvinyl alcohol (PVA), or the like. These materials may be employed as a single material or a combination of two or more of these materials may be used.

[Positive Electrode]

The positive electrode 11 is formed from a positive electrode current collector such as, for example, a metal foil, and a positive electrode mixture layer formed over the positive electrode current collector. For the positive electrode current collector, there may be employed a foil of a metal which is stable within a potential range of the positive electrode such as aluminum, a film on a surface layer of which the metal is placed, or the like. The positive electrode mixture layer includes, for example, a positive electrode active material, a binder agent, an electrically conductive material, or the like. The positive electrode 11 can be produced by, for example, applying a positive electrode mixture slurry including the positive electrode active material, the binder agent, the electrically conductive material, or the like over the positive electrode current collector, drying the applied film to form the positive electrode mixture layer, and then rolling the positive electrode mixture layer.

As the positive electrode active material, there may be exemplified, for example, a lithium-transition metal oxide containing transition metal elements such as Co, Mn, and Ni. As the lithium-transition metal oxide, there may be exemplified $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $LiMn_2O_4$, $Li_xMn_{2-y}M_yO_4$, $LiMPO_4$, and $Li_2MPO_4F$ (wherein M is at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$). These materials may be employed as a single material or a mixture of a plurality of these materials may be employed. From the viewpoint of increasing the capacity of the non-aqueous electrolyte secondary battery, the positive electrode active material desirably includes a lithium-nickel composite oxide such as $Li_xNiO_2$, $Li_xCo_yNi_{1-y}O_2$ and $Li_xNi_{1-y}M_yO_z$ (wherein M is at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$).

As the electrically conductive material, there may be exemplified, for example, carbon-based particles such as carbon black (CB), acetylene black (AB). Ketjenblack, carbon nanotube (CNT), graphene, graphite, or the like. These materials may be used as a single material or a combination of two or more of these materials may be used.

As the binder agent, there may be exemplified, for example, a fluororesin such as polytetrafluoroethylene (PTFE), polyvinylidene fluoride (PVdF), polyacrylonitrile (PAN), a polyimide-based resin, an acrylic resin, a polyolefin-based resin, or the like. These materials may be used as a single material or a combination of two or more of these materials may be used.

[Separator]

For the separator 13, for example, a porous sheet having an ion permeability and an insulating property is employed. Specific examples of the porous sheet include a microporous thin film, a woven fabric, a non-woven fabric, or the like. As a material forming the separator, there may be exemplified an olefin-based resin such as polyethylene and polypropylene, cellulose, or the like. Alternatively, the separator 13 may be a layered assembly having a cellulose fiber layer, and a thermoplastic resin fiber layer such as an olefin-based resin. Alternatively, the separator 13 may be a multiplayer separator including a polyethylene layer and a polypropylene layer, or a structure may be employed in which a material such as an aramid-based resin, ceramic, or the like is applied over a surface of the separator 13.

[Non-aqueous Electrolyte]

The non-aqueous electrolyte is a liquid electrolyte (electrolyte solution) including a non-aqueous solvent and an electrolyte salt dissolved in the non-aqueous solvent. For the non-aqueous solvent, for example, esters, ethers, nitriles such as acetonitrile, amides such as dimethylfomamide, or a mixture solvent of two or more of these solvents may be employed. The non-aqueous solvent may include a halogen-substituted product in which at least a part of hydrogens of the solvent described above is substituted with a halogen atom such as fluorine.

Examples of the esters include cyclic carbonates such as ethylene carbonate (EC), propylene carbonate (PC), and butylene carbonate, chain carbonates such as dimethyl carbonate (DMC), ethylmethyl carbonate (EMC), diethyl carbonate (DEC), methylpropyl carbonate, ethylpropyl carbonate, and methylisopropyl carbonate, cyclic carboxylates such as γ-butyrolactone and γ-valerolactone, and chain carboxylates such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofiran, 2-methyl tetrahydrofiran, propylene oxide, 1,2-butylene oxide, 1,3-dioxane, 1,4-dioxane, 1,3,5-trioxane, furan, 2-methyl furan, 1,8-cineol, and crown ether, and chain ethers such as 1,2-dimethoxy ethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxy benzene, 1,2-diethoxy ethane, 1,2-dibutoxy ethane, diethylene glycol dimethyl ether, diethylene glycol diethyl ether, diethylene glycol dibutyl ether, 1,1-dimethoxy methane, 1,1-diethoxy ethane, tiethylene glycol dimethyl ether, and tetraethylene glycol dimethyl ether.

As the halogen-substituted product, desirably, a fluorinated cyclic carbonate such as fluoroethylene carbonate (FEC), a fluorinated chain carbonate, or a fluorinated chain carboxylate such as fluoromethyl propionate (FiP) is employed.

The electrolyte salt is desirably a lithium salt. Examples of the lithium salt include $LiBF_4$, $LiClO_4$, $LiPF_6$, $LiAsF_6$, $LiSbF_6$, $LiACl_4$, LiSCN, $LiCF_3SO_3$, $LiCF_3CO_2$, $Li(P(C_2O_4)F_4)$. $LiPF_{6-x}(C_nF_{2+1})_x$ (wherein 1<x<6, n is 1 or 2), $LiB_{10}Cl_{10}$, LiCl, LiBr, LiI, lithium chloroborane, lithium lower aliphatic carboxylate, borate salts such as $Li_2B_4O_7$ and $Li(B(C_2O_4)F_2)$, and imide salts such as $LiN(SO_2CF_3)_2$, and $LN(C_lF_{2l+1}SO_2)(C_mF_{2m+1}SO_2)$ (wherein each of l and m is an integer greater than or equal to 1). As the lithium salt, these materials may be used as a single material or a mixture of a plurality of these materials may be used. Of these, $LiPF_6$ is desirably used, from the viewpoints of ion conductivity, electrochemical stability, or the like. A concentration of the lithium salt is desirably set to 0.8~1.8 mol per 1 L of the solvent.

EXAMPLES

The present disclosure will now be described in further detail with reference to Examples. The present disclosure, however, is not limited to the Examples.

Example 1

[Production of Positive Electrode]

As the positive electrode active material, aluminum-containing lithium nickel-cobaltate ($LiNi_{0.88}Co_{0.09}Al_{0.03}O_2$) was employed, 100 parts by mass of the positive electrode active material, 1 part by mass of graphite serving as the electrically conductive material, and 0.9 parts by mass of polyvinylidene fluoride powder serving as the binder agent were mixed, and a suitable amount of N-methyl-2-pyn-olidone (NMP) was added, to prepare a positive electrode mixture slurry. The slurry was applied over both surfaces of a positive electrode current collector formed from an aluminium foil (having a thickness of 15 μm) by a doctor blade method, the applied film was dried, and rolled with a rolling roller, to produce a positive electrode in which a positive electrode mixture layer was formed over both surfaces of the positive electrode current collector.

[Production of Graphite Particles A]

Cokes were ground until the average particle size (D50) was 17 μm, pitch serving as the binder agent was added to the ground cokes, and the cokes were aggregated. An isotropic pressure was applied to the aggregate, to produce a block-form shaped structure having a density of 1.6 $g/cm^3$-1.9 $g/cm^3$. The block-form shaped structure was baked at a temperature of 2800° C. for graphitization, and the graphitized block form shaped structure was ground and sieved using a sieve of 250 meshes, to produce graphite particles A having an average particle size (D50) of 23 μm.

[Production of Graphite Particles B]

Cokes were ground until the average particle size (D50) was 13 μm, pitch serving as the binder agent was added to the ground cokes, and the cokes was aggregated until the average particle size (D50) was 18 μm. The aggregate was baked at a temperature of 2800° C. for graphitization. The graphitized block form shaped structure was ground and sieved using a sieve of 250 meshes, to produce graphite particles B having an average particle size (D50) of 23 μm.

[Production of Negative Electrode]

95 parts by mass of the graphite particles A, and 5 parts by mass of SiO were mixed, and the mixture was set as a negative electrode active material A. As the highly dielectric material, titanium oxide ($TiO_2$) having an average particle size (D50) of 500 nm was used. The negative electrode active material A, $TiO_2$, carboxymethyl cellulose (CMC), and styrene-butadiene copolymer rubber (SBR) were mixed with a mass ratio of (negative electrode active material A):($TiO_2$):(CMC):(SBR) of 100:2.5:1:1, and the mixture was kneaded in water, to prepare a first negative electrode mixture slurry, 95 parts by mass of the graphite particles B, and 5 parts by mass of SiO were mixed, and the mixture was set as a negative electrode active material B. The negative electrode active material B, carboxymethyl cellulose (CMC), and styrene-butadiene copolymer rubber (SBR) were mixed with a mass ratio of (negative electrode active material B):(CMC):(SBR) of 100:1:1, and the mixture was kneaded in water, to prepare a second negative electrode mixture slurry.

The first negative electrode mixture slurry was applied over both surfaces of a negative electrode current collector formed from a copper foil by the doctor blade method, and was dried to form a first negative electrode mixture layer. Further, the second negative electrode mixture slurry described above was applied over the first negative electrode mixture layer, and was dried, to form a second negative electrode mixture layer. In this process, an application mass ratio per unit area between the first negative electrode mixture slurry and the second negative electrode mixture slurry was set to 5:5. The first negative electrode mixture layer and the second negative electrode mixture layer were rolled by a rolling roller, to produce a negative electrode.

[Production of Non-Aqueous Electrolyte]

To 100 parts by mass of a non-aqueous solvent in which ethylene carbonate (EC) and dimethyl carbonate were mixed in a volume ratio of 1:3, 5 parts by mass of vinylene carbonate (VC) was added, $LiPF_6$ was dissolved with a concentration of 1.5 mol/L, and the resulting material was set as a non-aqueous electrolyte.

[Production of Non-Aqueous Electrolyte Secondary Battery]

(1) After a positive electrode lead was attached to the positive electrode current collector and a negative electrode lead was attached to the negative electrode current collector, the positive electrode and the negative electrode were wound with a separator formed from a polyethylene microporous film therebetween, to produce a wound-type electrode assembly.

(2) Insulating plates were placed respectively above and below the electrode assembly, the negative electrode lead was welded to an outer housing, the positive electrode lead was welded to a sealing assembly, and the electrode assembly was housed in the outer housing.

(3) After the non-aqueous electrolyte was injected through a reduced pressure method into the outer housing, an opening of the outer housing was sealed with the sealing assembly via a gasket, to form a non-aqueous electrolyte secondary battery.

Example 2

A non-aqueous electrolyte secondary battery was produced in a manner similar to Example 1 except that the percentage content of $TiO_2$ included in the first negative electrode mixture slurry was set to 3 mass % with respect to the mass of the negative electrode active material A in the production of the negative electrode.

Example 3

A non-aqueous electrolyte secondary battery was produced in a manner similar to Example 1 except that the percentage content of $TiO_2$ included in the first negative electrode mixture slurry was set to 5 mass % with respect to the mass of the negative electrode active material A in the production of the negative electrode.

Comparative Example 1

A non-aqueous electrolyte secondary battery was produced in a manner similar to Example 1 except that $TiO_2$ was not added to the first negative electrode mixture slurry in the production of the negative electrode.

Comparative Example 2

A non-aqueous electrolyte secondary battery was produced in a manner similar to Comparative Example 1 except that $TiO_2$ was added to the second negative electrode mixture slurry in an amount of 2.5 mass % with respect to the mass of the negative electrode active material B in the production of the negative electrode.

Comparative Example 3

A non-aqueous electrolyte secondary battery was produced in a manner similar to Example 1 except that the percentage content of $TiO_2$ included in the first negative electrode mixture slurry was set to 1.5 mass % with respect to the mass of the negative electrode active material A, and $TiO_2$ was added to the second negative electrode mixture slurry in an amount of 1.5 mass % with respect to the mass of the negative electrode active material B in the production of the negative electrode.

[Assessment of Porosity Between Graphite Particles]

Under an environmental temperature of 25° C., the non-aqueous electrolyte secondary batteries of Examples and Comparative Examples were charged with a constant current of 0.2 C (920 mA) to 4.2 V, and were then charged with a constant voltage of 4.2V until C/50. Then, the non-aqueous electrolyte secondary batteries were discharged with a constant current of 0.2 C until 2.5 V. With these charging and discharging as one cycle, 5 cycles of charging and discharging were performed. The negative electrodes were taken out from the non-aqueous electrolyte secondary batteries of Examples and Comparative Examples after the 5 cycles, and porosity between graphite particles was calculated for each battery.

[Assessment of Capacity Maintenance Percentage]

Under an environmental temperature of 25° C., the non-aqueous electrolyte secondary batteries of Examples and comparative Examples were charged with a constant current of 1 C (4600 mA) until 4.2 V, and were then charged with a constant voltage of 4.2 V until the current value reached 1/50 C. Then, the non-aqueous electrolyte secondary batteries were discharged with a constant current of 0.5 C until 2.5 V. With these charging and discharging as one cycle, 100 cycles of charging and discharging were performed. A capacity maintenance percentage at the charge/discharge cycle was determined by the following formula for the non-aqueous electrolyte secondary batteries of Examples and Comparative Examples.

(Capacity maintenance percentage)=((discharge capacity at 100th cycle),(discharge capacity at 1st cycle))×100

TABLE 1 summarizes assessment results of the capacity maintenance percentages for the non-aqueous electrolyte secondary batteries of Examples and Comparative Examples. TABLE 1 also shows values for graphite particles contained in the first negative electrode mixture layer and in the second negative electrode mixture layer, percentage contents of $TiO_2$ in the first negative electrode mixture layer and in the second negative electrode mixture layer, and S2/S1 in the negative electrode mixture layer.

TABLE 1

| | NEGATIVE ELECTRODE MIXTURE LAYER | | | | | ASSESSMENT RESULT |
|---|---|---|---|---|---|---|
| | GRAPHITE PARTICLES | | $TiO_2$ PERCENTAGE CONTENT (MASS %) | | RATIO OF INTER-PARTICLE POROSITY (S2/S1) | CAPACITY MAINTENANCE PERCENTAGE (%) |
| | FIRST LAYER | SECOND LAYER | FIRST LAYER | SECOND LAYER | | |
| EXAMPLE 1 | A | B | 2.5 | 0 | 1.39 | 89.3 |
| EXAMPLE 2 | A | B | 3 | 0 | 1.38 | 89.2 |
| EXAMPLE 3 | A | B | 5 | 0 | 1.35 | 87.6 |
| COMPARATIVE EXAMPLE 1 | A | B | 0 | 0 | 1.39 | 85.8 |
| COMPARATIVE EXAMPLE 2 | A | B | 0 | 2.5 | 1.39 | 84 |
| COMPARATIVE EXAMPLE 3 | A | B | 1.5 | 1.5 | 1.39 | 83.1 |

FIRST LAYER: FIRST NEGATIVE ELECTRODE MIXTURE LAYER.
SECOND LAYER: SECOND NEGATIVE ELECTRODE MIXTURE LAYER

It was confirmed that, in the batteries of Examples, the capacity maintenance percentage was improved in comparison to Comparative Examples. It can be considered that the capacity maintenance percentage was improved in the batteries of Examples because the permeability of the electrolyte solution in the negative electrode mixture layer as a whole was improved because the porosity between graphite particles is higher in the second negative electrode mixture layer, and the first negative electrode mixture layer contains titanium oxide having a higher relative dielectric constant than the graphite.

REFERENCE SIGNS LIST

10 secondary battery, 11 positive electrode, 12 negative electrode, 13 separator. 14 electrode assembly, 15 outer housing, 16 sealing assembly, 17, 18 insulating plate, 19 positive electrode lead, 20 negative electrode lead, 21 groove portion. 22 filter, 23 lower vent member, 24 insulating member, 25 upper vent member, 26 cap, 26*a* opening, 27 gasket, 30 negative electrode current collector, 32 negative electrode mixture layer, 32*a* first negative electrode mixture layer, 32*b* second negative electrode mixture layer, 40 graphite particle, 42 internal pore. 44 external pore.

The invention claimed is:

1. A non-aqueous electrolyte secondary battery comprising:

a positive electrode;

a negative electrode; and a non-aqueous electrolyte, wherein the negative electrode comprises a negative electrode current collector, and a negative electrode mixture multilayer coating formed over a surface of the negative electrode current collector, the negative electrode mixture multilayer coating comprises a first negative electrode mixture layer opposing the negative electrode current collector, and a second negative electrode mixture layer layered over a surface of the first negative electrode mixture layer, the negative electrode mixture multilayer coating includes a negative electrode active material including graphite particles, and a highly dielectric material having a higher dielectric constant than the graphite particles, the highly dielectric material is dispersed in the negative electrode mixture multilayer coating, a second inter-particle porosity of a second matrix between the graphite particles in the second negative electrode mixture layer is higher than a first inter-particle porosity of a first matrix between the graphite particles in the first negative electrode mixture layer, and a first percentage content of the highly dielectric material in the first negative electrode mixture layer is higher than a second percentage content of the highly dielectric material in the second negative electrode mixture layer.

2. The non-aqueous electrolyte secondary battery according to claim 1, wherein the highly dielectric material includes at least one of titanium oxide or lithium titanate.

3. The non-aqueous electrolyte secondary battery according to claim 1, wherein the percentage content of the highly dielectric material in the first negative electrode mixture layer is 1 mass %~10 mass % with respect to a mass of the negative electrode active material included in the first negative electrode mixture layer.

4. The non-aqueous electrolyte secondary battery according to claim 1, wherein the negative electrode mixture layer further includes a Si-based material serving as the negative electrode active material.

* * * * *